United States Patent
Morris (10) Patent No.: US 11,556,572 B2
(45) Date of Patent: Jan. 17, 2023

(54) SYSTEMS AND METHODS FOR COVERAGE ANALYSIS OF TEXTUAL QUERIES

(71) Applicant: Nice Ltd., Ra'anana (IL)

(72) Inventor: Robert William Morris, Decatur, GA (US)

(73) Assignee: NICE LTD., Ra'anana (IL)

(*) Notice: Subject to any disclaimer, the term of this patent is extended or adjusted under 35 U.S.C. 154(b) by 51 days.

(21) Appl. No.: 16/391,761

(22) Filed: Apr. 23, 2019

(65) Prior Publication Data

US 2020/0342016 A1 Oct. 29, 2020

(51) Int. Cl.
  *G06F 16/332* (2019.01)
  *G06F 16/35* (2019.01)
  *G06N 3/02* (2006.01)
  *G06F 17/16* (2006.01)
  *G06F 40/295* (2020.01)

(52) U.S. Cl.
  CPC ...... *G06F 16/3329* (2019.01); *G06F 16/3328* (2019.01); *G06F 16/358* (2019.01); *G06F 17/16* (2013.01); *G06F 40/295* (2020.01); *G06N 3/02* (2013.01)

(58) Field of Classification Search
  CPC ...... G06F 16/00; G06F 16/144; G06F 16/148; G06F 16/156; G06F 16/242; G06F 16/24; G06F 16/243; G06F 16/245; G06F 16/2453; G06F 16/332; G06F 16/3332; G06F 16/3329; G06F 16/3328; G06F 16/358; G06F 16/38; G06F 16/3338; G06F 40/295; G06F 17/16; G06N 3/02
  See application file for complete search history.

(56) References Cited

U.S. PATENT DOCUMENTS

| | | | | |
|---|---|---|---|---|
| 5,943,669 | A * | 8/1999 | Numata | G06F 16/353 |
| 9,645,999 | B1 * | 5/2017 | Ciulla | G06F 16/35 |
| 2003/0204499 | A1 * | 10/2003 | Shahabi | G06F 16/24556 |
| 2006/0026152 | A1 * | 2/2006 | Zeng | G06F 16/951 |
| 2006/0242140 | A1 * | 10/2006 | Wnek | G06F 16/355 |
| 2010/0114882 | A1 * | 5/2010 | Wiegering | G06F 16/9535 707/728 |
| 2016/0042053 | A1 * | 2/2016 | De Sousa Webber | G06F 16/35 707/739 |
| 2016/0085783 | A1 * | 3/2016 | Cevahir | G06F 16/285 707/738 |
| 2018/0189307 | A1 * | 7/2018 | Yu | G06F 16/221 |
| 2018/0308487 | A1 * | 10/2018 | Goel | G10L 15/26 |

(Continued)

*Primary Examiner* — Lamont M Spooner
*Assistant Examiner* — Sean E Serraguard
(74) *Attorney, Agent, or Firm* — Pearl Cohen Zedek Latzer Baratz LLP (57) ABSTRACT

A computer based system and method for assigning queries to topics and/or visualizing or analyzing query coverage may include, using a computer processor, searching, using a set of queries, over a set of text documents, to produce for each query a set of search results for the query. Each search result may include a subset of text from a text document of the set of text documents. For each query, a query vector may be calculated based on the set of search results for the query, and for each of a set of topics describing the set of text documents, a topic vector may be calculated. A report or visualization may be generated including the set of queries and the set of topics using the topic vectors and the query vectors.

20 Claims, 6 Drawing Sheets

(56) References Cited

U.S. PATENT DOCUMENTS

2019/0034479 A1* 1/2019 Kafai .................. G06F 16/2379
2020/0226126 A1* 7/2020 Zou ........................ G06N 3/088
2020/0311077 A1* 10/2020 Zhang ............... G06F 16/24542

* cited by examiner

FIG. 6

SYSTEMS AND METHODS FOR COVERAGE ANALYSIS OF TEXTUAL QUERIES

FIELD OF THE INVENTION

The invention relates generally to analysis of the coverage of textual queries of a set of documents, such as transcripts.

BACKGROUND OF THE INVENTION

Companies and organizations such as call centers may use queries to find files, transcripts or events in call center media, which may include for example transcripts of conversations or calls between customer service agents and customers. Companies and organizations such as call centers may create and store interactions, which may be conversations or data exchanged between, typically, an agent or representative (typically human) of the company and a customer. Interactions may include, for example, voice, audio or video recordings of conversations, and/or other data such as text, e-mail or instant messaging exchanges. Interactions may be converted from one format to another, and may include more than one different format of data: e.g. an interaction may include an audio conversation and/or a text version of that conversation created by for example automatic speech recognition (ASR). Text versions of interactions may be stored and searched for.

Typically, personnel at an organization create a set of queries (e.g. in one particular implementation, "call driver" queries) to search for and categorize transcripts of calls or other documents for example by caller intent. Creating queries can be an expensive and slow process, for example requiring a user to manually listen to many conversations. It is currently difficult to find "missing" search queries (e.g. not existing in the sense that documents or conversations exist in the organization's data base that are not covered by any queries), or missing call drivers, without extensive manual listening to calls. One current labor-intensive method for finding new queries is to run all existing queries over a set of documents or interactions. The set of interactions not found by any of the queries may be referred to as the "Other Bucket". Users then typically manually listen to these files to find new topics of interest to create new queries.

There is a need to allow automatic analysis of the correspondence between text search queries and groups (e.g. topics) of text files or conversations. A topic when used herein may be for example a group or subset of phrases or key phrases, which may together represent a subject or theme common to multiple documents or conversation transcripts. A topic as used herein may also refer to the theme represented by phrases.

SUMMARY OF THE INVENTION

A computer based system and method for assigning queries to topics and/or visualizing or analyzing query coverage may include, using a computer processor, searching, using a set of queries, over a set of text documents, to produce for each query a set of search results for the query. Each search result may include a subset of text from a text document of the set of text documents. For each query, a query vector may be calculated based on the set of search results for the query, and for each of a set of topics describing the set of text documents, a topic vector may be calculated. A report or visualization may be generated including the set of queries and the set of topics using the topic vectors and the query vectors.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may take as input a large number of documents (e.g. transcripts of interactions, which may be conversations) and pre-set or previously created queries for use on those documents (e.g. text queries, as known in the art). Such previously created queries may have been created, for example by human operators, for use over a particular set or type of documents. Embodiments may produce a report or visualization (e.g. graph) showing clusters or groups representing groups of phrases, which may be called topics. These topics, or groupings or sets of phrases, may be rough proxies for grouping of documents. A topic may be in some embodiments a set of phrases; other descriptions may be used. In one embodiment, a visualization or report shows, for the phrases associated with or extracted from the documents, the phrases grouped or clustered and labelled by topic of the groups of phrases, with queries are displayed as well. Topics may be formed by clusters of phrases, but in another embodiment, documents may be clustered to form topics. Such a visualization or report may assign the queries to topics by showing which groups or clusters of documents are covered and not covered by a query. For example links or lines may tie queries to topics covered by the queries. A query covering a document may mean that the search using the query produces as an output at least the document, or a reference to or section of the document. If used in the context of a call center, missing "call driver" queries may be developed by call center personnel for topics not covered by existing queries.

An embodiment may search, using for one the input set of queries, over the input set of text documents (e.g. apply queries to documents), to produce for the query a set of search results for the query. A search result may include for example for each document matching the query an identification of or reference to a document matching the query and/or a subset of text from the document. Embeddings or vectors (e.g. ordered lists of values) may be produced or calculated for each search result and for each query. The vector for the query may be calculated based on or using the set of search results for the query; for example, an average of vectors for search results matching the query or returned by the query (or by proxy vectors for phrases in those search results) may be created.

Vectors, typically of the same dimensionality or length as the query vectors and phrase vectors, may be calculated for each of a set of topics describing the documents. For each topic, it may be determined if a query of the set of queries covers the topic for example by using the topic embedding or vector for the topic and the query embedding or vector for the query. For example, a visualization showing grouped or clustered topics may be created, which depicts which topics correspond to or are covered by queries and which do not. A topic being covered by a query may be in some embodiments may mean that the documents corresponding to the topic are returned or "hit" by the query being executed or searched over the larger collection of documents. Embodiments may create semantic representations of existing queries and integrate these queries into a visualization. In response to a report or visualization, a person may create a new query intended to cover un-covered topics (e.g. by "clicking" on a visualized topic to see component phrases and creating topics based on the results), and re-execute an embodiment of a process to determine if the new query covers the un-covered topics.

Figure 1:
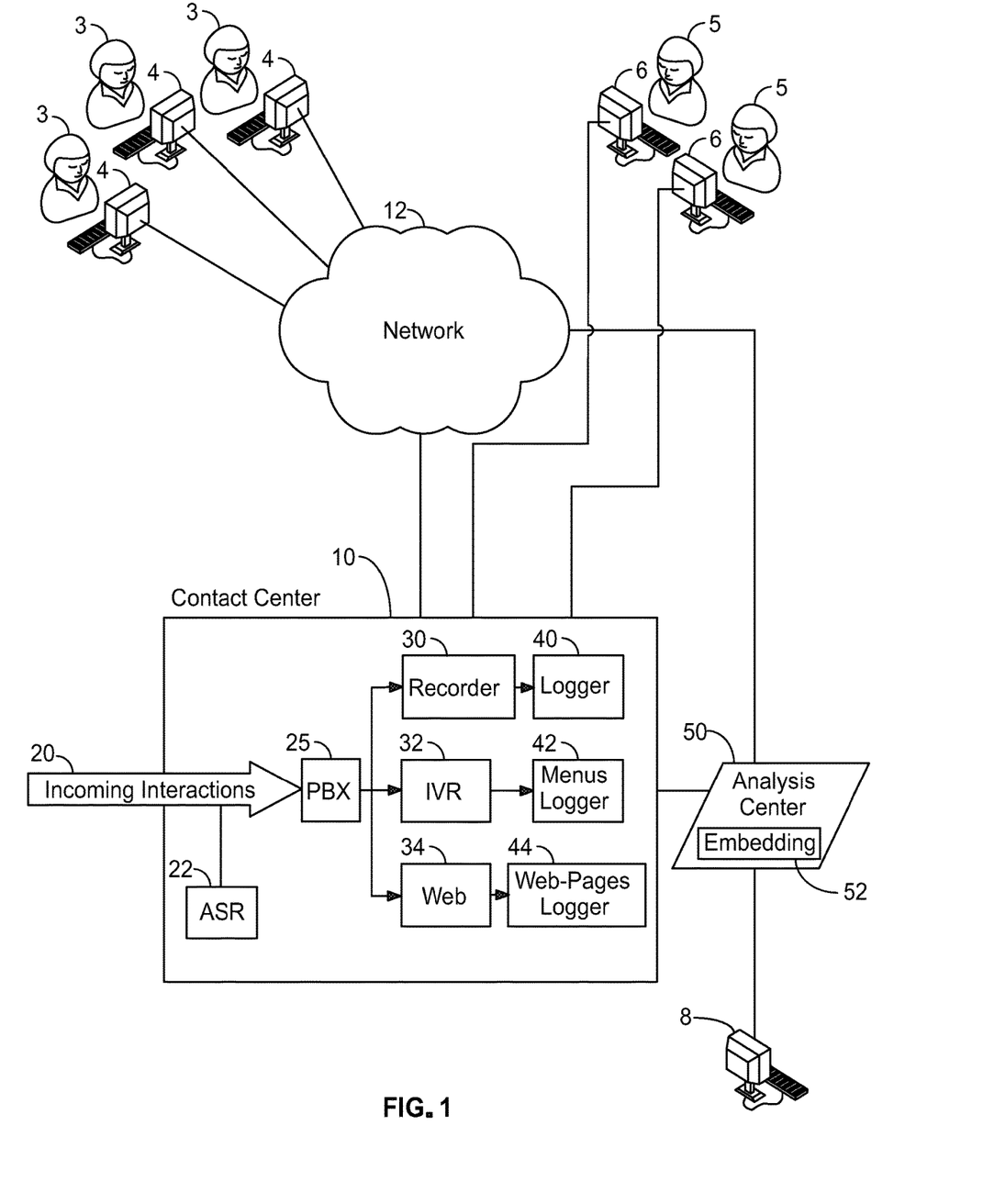
FIG. 1 is a block diagram of a system for determining coverage of queries according to an embodiment of the present invention.

FIG. 1 is a block diagram of a system for analyzing queries according to an embodiment of the present invention. While FIG. 1 shows a such a system in the context of a contact center, embodiments of the invention may be used in other contexts. Incoming interactions 20 (e.g. conversations, telephone calls, IVR interactions, etc.) among people 3 (e.g., customers) and agents 5 may enter a contact center 10 and be routed for example by a PBX (private branch exchange) 25 or other equipment to relevant systems, such as interactive voice response (IVR) block or processor 32, Internet sessions or web block 34 and voice interactions block or recorder 30. People 3 may operate external user equipment 4 to communicate with agents 5 via contact center 10; and agents 5 may operate agent terminals 6 for that communication and other purposes. User terminals 8 may allow users, such as contact or data center personnel, to run, configure, generate and manipulate queries, and view visualizations or reports of query coverage. Incoming interactions 20 may be pre-processed and may enter the system as text data, or may be converted to text via ASR module 22.

Figure 2:
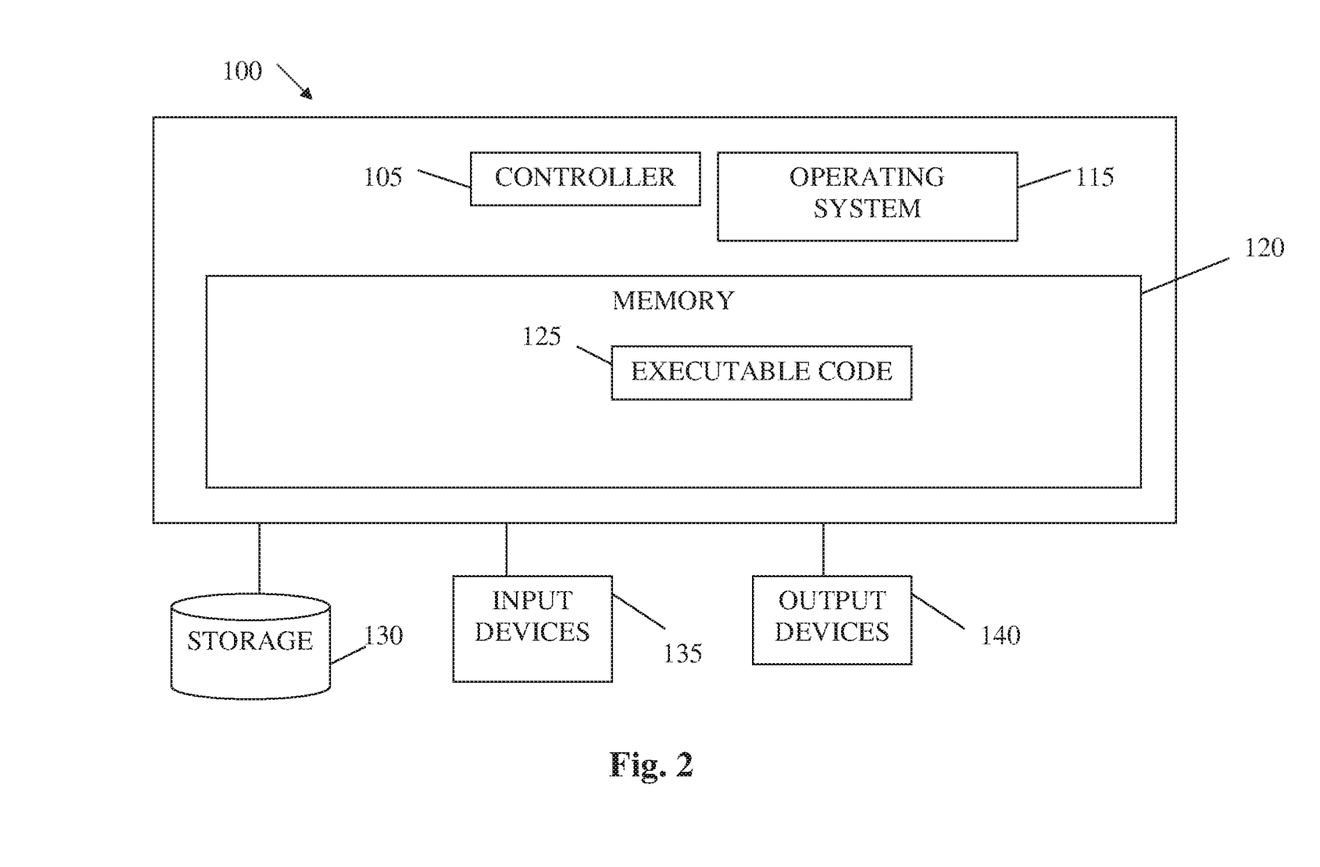
FIG. 2 is a high-level block diagram of an exemplary computing device which may be used with embodiments of the present invention.

User equipment 4, agent terminals 6 and user terminals 8 may include computing or telecommunications devices such as personal computers or other desktop computers, conventional telephones, cellular telephones, portable or tablet computers, smart or dumb terminals, etc., and may include some or all of the components such as a processor shown in FIG. 2.

Interaction data or documents may be stored, e.g., in files and/or databases. For example logger 40, menus logger 42, and web-page logger 44 may record information related to interactions, such as the content or substance of interactions (e.g. recordings and/or transcripts of telephone calls) and metadata (e.g. telephone numbers used, customer identification (ID), etc.). In the case that documents other than interactions are used, other databases may be used. The data from contact center 10 may be output, sent or exported to an analysis center 50, which may be part of contact center 10, or external to and/or remotely located from contact center 10.

Figure 3:
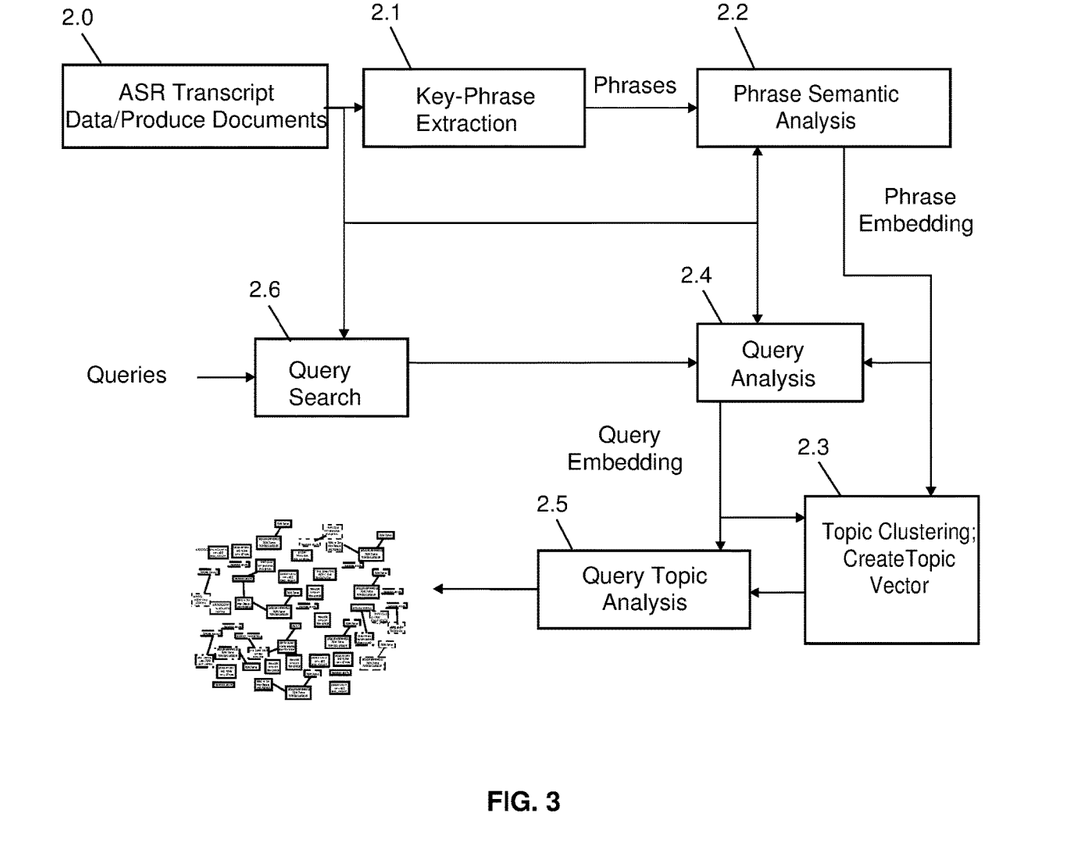
FIG. 3 is a flowchart of a method according to embodiments of the present invention.
Figure 4:
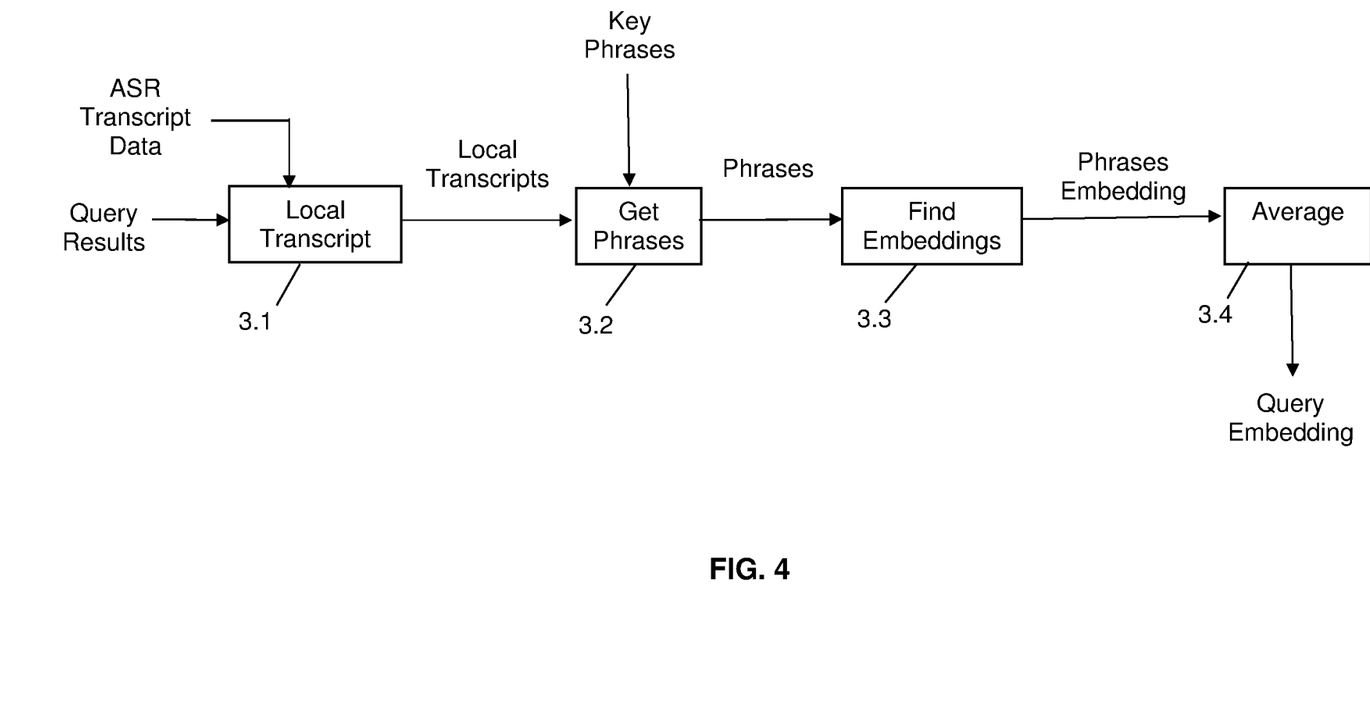
FIG. 4 is a flowchart of a method according to embodiments of the present invention.
Figure 5:
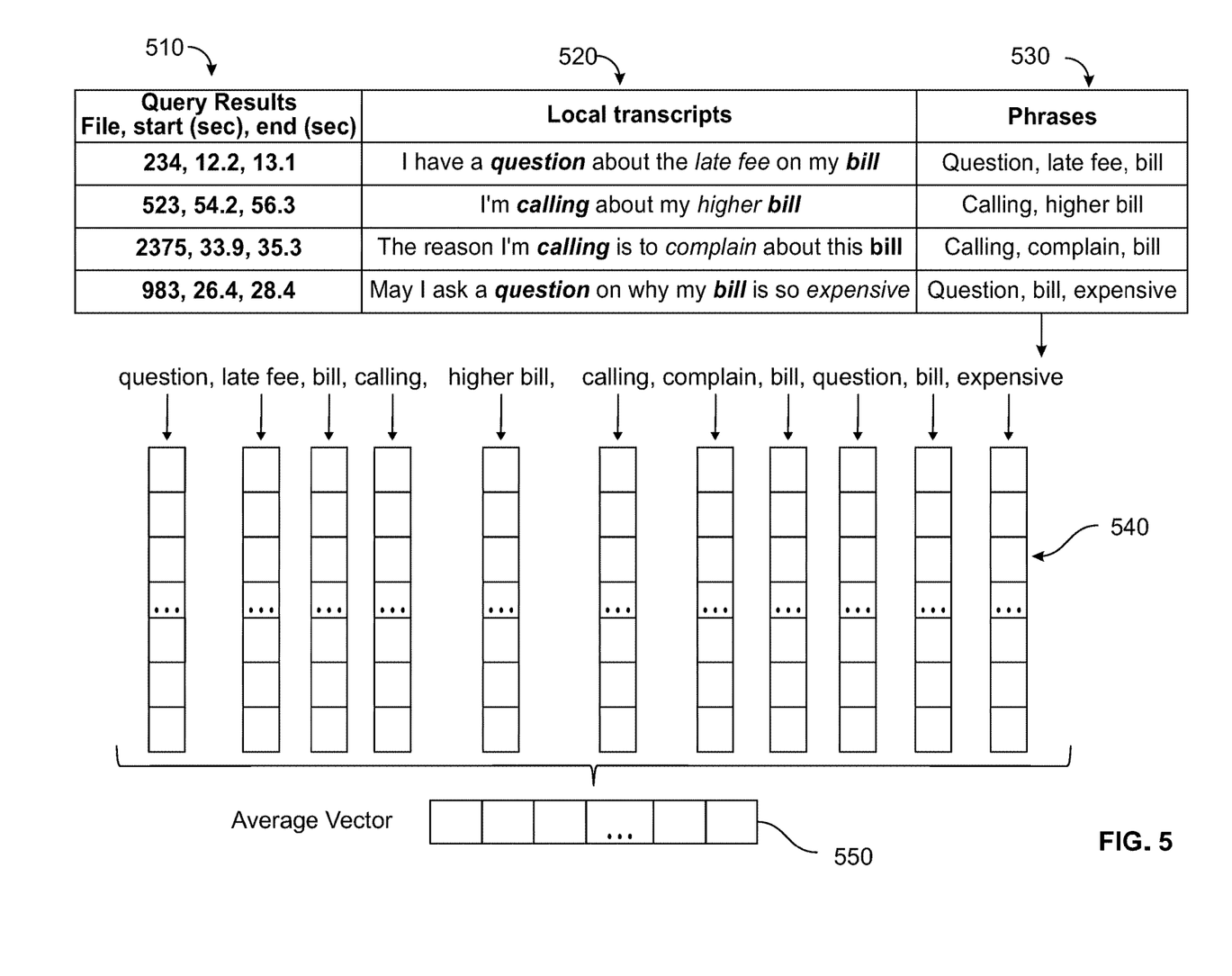
FIG. 5 depicts an example of a generation of a query embedding according to embodiments of the present invention.

Analysis center 50 may perform functions such as those shown in FIGS. 3-5, and may include for example embedding module 52 which may be or may be implemented as a machine learning or neural network algorithm, or by another system. Embedding module 52 may for example create embedding vectors. Analysis center 50 may communicate with one or more user terminals 8 to for example provide visualizations.

One or more networks 12 may connect equipment or modules not physically co-located, for example connecting external user equipment 4 to contact center 10, and contact center 10 to analysis center 50. Networks 12 may include for example telephone networks, the Internet, or other networks. While in FIG. 1 contact center 10 is shown passing data to analysis center 50, these modules may communicate via a network such as networks 12.

Web block 34 may support web interactions over the Internet (e.g. operate web pages which may be executed in part on user equipment), IVR block 32 may provide menus and other information to customers and for obtaining selections and other information from customers, and recorder 34 may process or record voice sessions with customers. It may be appreciated that contact center 10 presented in FIG. 1 is not limiting and may include any blocks and infrastructure needed to handle voice, text (SMS (short message service), WhatsApp messages, chats, etc.) video and any type of interaction with costumers.

FIG. 2 shows a high-level block diagram of an exemplary computing device which may be used with embodiments of the present invention. Computing device 100 may include a controller or processor 105 that may be, for example, a central processing unit processor (CPU), a chip or any suitable computing or computational device, an operating system 115, a memory 120, a storage 130, input devices 135 and output devices 140. Each of modules and equipment such as contact center 10, ASR module 22 PBX 25, IVR block 32, voice interactions block or recorder 30, menus logger 42, connect API 34, analysis center 50, external user equipment 4, and agent terminals 6, user terminals 8 and other modules discussed herein may be or include a computing device such as included in FIG. 2, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or data such as queries, documents, interactions, etc.

Executable code 125 may be any executable code, e.g., an application, a program, a process, task or script. Executable code 125 may be executed by controller 105 possibly under control of operating system 115. For example, executable code 125 may be one or more applications perform methods as disclosed herein, for example those of FIGS. 3-5, according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as documents or interactions may be stored in a storage 130 and may be loaded from storage 130 into a memory 120 where it may be processed by controller 105. In some embodiments, some of the components shown in FIG. 2 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

FIG. 3 is a flowchart of a method according to embodiments of the present invention. While in one embodiment the operations of FIG. 3 are carried out using systems as shown in FIGS. 1 and 2, in other embodiments other systems and equipment can be used. Queries, such as a working set of queries used to search over an established and/or changing (e.g. having documents added over time) set of documents, may be assigned or connected to topics which summarize or describe groups of those documents. Auto-categorization technology may categorize documents, media or text files, such as conversation or phone call transcripts.

Referring to FIG. 3, documents or interactions, or other documents, may be produced or processed in operation 2.0. For example, ASR (e.g. using ASR module 22) may be used to process interactions such as telephone calls (e.g. audio recordings), to produce text transcripts or documents. While transcripts of interactions are discussed herein, documents other than transcripts may be used, and ASR processing need not be used. A large corpus of documents (e.g. 50,000 to 500,000, or over a million) such as transcripts to be analyzed may be processed or created.

In operation 2.1, phrases or key phrases (e.g. common key phrases) may be extracted or created from the set or corpus of documents. The set of phrases extracted may be used in more than one phase of a process according to embodiments of the invention. Phrase extraction may be performed for example using a combination of occurrence data, e.g. the number of times the phrase occurs in the set of documents, along with various filtering mechanisms. A phrase may be a collection of one or more words, such as "billing", "watch basketball", "professional sports", or "not exercising enough". Typically, a phrase is useful in characterizing or searching for the document containing the phrase, as opposed to being a general or non-distinguishing set of words contained in the document. In some embodiments, the phrases or key phrases extracted (possibly with key phrases combined to be treated as single words) may be used as tokens to train a word embedding model (e.g. a Word2Vec process).

From initially extracted phrases, key phrases may be produced, for example by modification of an initial set of phrases and/or editing of phrases in the initial set. Key phrases may be for example phrases that are filtered or altered to remove redundant or not useful words, or phrases selected from a set of phrases where the selected phrases do not include redundant or not useful words. In some embodiments, a set of key phrases may be produced by altering phrases; or a set of key phrases may be produced by filtering or removing some phrases (e.g. starting or stopping with stop words) from the initial set of phrases; or both alteration and removal may be used. Words removed, or scanned for, to produce key phrases may include common words (e.g. "thank you"), phrases that are subsets of other phrases, and/or "stop words", e.g. commonly used words which can be ignored or removed (e.g. prepositions, articles, "the", "a", "an", "in", "of"). A list of stop words may be for example a manually curated list. A phrase that is a subset of another phrase a certain amount of occurrences (e.g. more the 50% of the time) may be removed. In some embodiments a fixed or pre-set number, e.g. 3,000, of key phrases may be identified, but other numbers of key phrases may be identified. Phrases from a set of phrases that start or end with stop words may be removed, and phrases that include in the middle of the phrase stop words may be kept, in order to produce a set of key phrases. For example, if in a set of phrases all of the phrases "goal of my call", "goal of" and "of my call" exist, the latter two, starting and ending with the stop word "of", may be removed, to result in the one key phrase of "goal of my call". In some embodiments, phrases may be used, without the use of further extracted or altered key phrases: thus when used herein it is to be understood that operations described as using phrases may use key phrases, and/or an initial unaltered set of extracted phrases. Key phrases as distinct from phrases need not be used, and operation 2.2 and other operations may use phrases not refined to key phrases as discussed herein.

In operation 2.2, semantic analysis of key phrases may be performed, for example by creating a vector or embedding, or other structure, for each phrase in the set of phrases or key phrases determined in operation 2.1. The semantic analysis or vectors may capture semantic information which can be used to compare each phrase to other phrases or other entities. Each embedding or vector created for a key phrases or phrases may be stored with or associated with that phrase. The key phrase embeddings or vectors, or phrase embeddings or vectors, created may be used in other operations to quickly produce semantic analysis or embeddings. Thus in some embodiments an improvement occurs in that the more computationally intensive task of creating an embedding or vector directly from text may be shortcut by using embeddings created beforehand (e.g. in operation 2.2) for phrases that may appear in or characterize that text. While key phrases as distinct from phrases are discussed, in one embodiment phrases may be used without the process to convert phrases to key phrases. Further, since key phrases are a special case of phrases, the term phrase vector (as created in operation 2.2) may include or refer to key phrase vectors.

In one embodiment a version of the Word2Vec algorithm, or another suitable process, may be used to produce for each phrase or word an embedding or vector (e.g. an ordered list of values), typically of several hundred values or dimensions (e.g. 200 values or dimensions), with each unique word or phrase being assigned a corresponding vector. A phrase vector may measure the linguistic context of the phrase associated with the vector. Phrases may be grouped or clustered into topics and for example visualized for the user.

In operation 2.3, groups or clusters, or topics, may be created. Documents or phrases (e.g. the same phrases created in operation 2.1) may be clustered or grouped, e.g. into topics, and topic vectors or embeddings may be created. In some embodiments, a topic may be considered a group of documents related by a common subject, the documents grouped by proxy by grouping into topics phrases, e.g. component phrases, appearing in the documents.

Clustering or grouping phrases may be performed by using the known k-means algorithm or another suitable algorithm on the associated word-embedding vectors, for example with a fixed or pre-set number of clusters (e.g. 100 clusters). K-means clustering may use vector quantization to partition phrases, documents, interactions, etc. into clusters where each item belongs to the cluster with the nearest mean. Topic clustering may be performed according to phrase vectors or key phrase vectors (e.g. those created in operation 2.2). Query embeddings or vectors may be used as input to topic clustering, e.g. as initial centroids (e.g. the mean position of all the entities in all of the coordinate directions). The clustering or grouping may assign each phrase to a cluster or group, each cluster or group forming a topic. As phrases are assigned to the topic, the centroid may be moved or adjusted.

In one embodiment for each topic in the set of topics created a topic vector or cluster embedding vector may be calculated or created. In one embodiment the topic vector has the same dimensionality as the phrase embedding vectors and is mathematically equal to the centroid of the topic, or the centroid of the component phrase vectors: since the centroid may be defined by a vector which is the mean of the vectors defining the members of the topic, defining the centroid via, e.g. k-means, may inherently define the vector of the centroid and thus the topic. Topic embeddings are typically based on the member phrases of the topic. The vector for the centroid of the topic, and thus the topic vector for the topic, may be the average of the vectors associated with the phrases in the topic. E.g., each phrase in a topic is added to a set and all phrase vectors for the phrases in the set are averaged. Other methods of calculating an embedding or vector for a topic or centroid may be used.

Queries, or representations of queries, may be placed in the graph, report, or visualization. For example, queries according to the Nexidia query language and used with the Nexidia phonetic search engine may be used, but other query formats and systems may be used. Queries may be visualized to compare them with topics.

In operation 2.6, in one embodiment, a set of queries (e.g. queries created by a person, or a set of preexisting queries) are used to search over, or are applied to, a set of documents (e.g. text documents or ASR transcript data) to create a collection of query or search results. For each query, search results may be produced or returned, including a reference to or description of any (possibly zero) documents in the searched-over corpus covered by or matching the query (e.g. documents matching the requirement of the query). Query results may include for example "hit locations" (locations in documents of text found by queries), or an excerpt or subset of text for each matching or covered document, for example an identification of each document, with a start and end time, or start and end position, of the relevant or returned text within the document (e.g. InteractionId, Start Time Offset, End Time Offset). As discussed with respect to FIG. 4, this may be a two-step process: individual documents may be found matching the query, and then for each matching or covered document, a window or subset of text within the document may be determined. The excerpt or local transcript may be variable in size, depending on the specific matches of words or terms in the document to the query. The size of the excerpt may also depend on a certain amount of time or words on either side of the matches: for example, text within five seconds (or another period of time) of the matched terms may be included in the excerpt or local transcript, when measured by reference to the original audio document from which the transcript is created. Text within a certain number of words of the matched terms may be included in the excerpt or local transcript.

One example query format and system used with an embodiment of the present invention is the Nexidia Interaction Analytics system, but other query systems may be used. A query may be formed from a query language that includes searches for phrases. An example of a query language is shown in Table 1, below (other queries may be used):

TABLE 1

| Operator | Description |
| --- | --- |
| OR( ) | True if any of subexpressions found |
| AND_x( ) | True if all of subexpressions found within x seconds |
| BEFORE_x( ) | True if first expression occurs before second expression |
| AND( ) | True if all subexpressions found in same file |
| ANDNOT_x( ) | True if first expression found, but not any following within x seconds |

TABLE 1-continued

| Operator | Description |
| --- | --- |
| ANDNOT( ) | True if first expression found, but not any following within same file |
| FIRST_x( ) | True if expression found in first x seconds |
| LAST_x( ) | True if expression found in last x seconds |
| NOTFIRST_x( ) | True if expression not found in first x seconds |
| NOTLAST_x( ) | True if expression not found in last x seconds |

A query may return not just a document, but in addition, or rather, a point in the document corresponding to a query, or a sub-transcript, a portion of text within the transcript, corresponding to the query. For example, a query to find documents regarding billing might be Billing=FIRST_120 (AND_30(OR("question","calling")), "bill"))). This query would find any point in a document (e.g. a transcript of a call) where "question" or "calling about" occurs within 30 seconds of "bill", but only in the first 120 seconds of the call.

When used herein a query may refer to the query text, e.g. "bill (within 10) late" and also the process of applying the query text to a set of documents (e.g. using the query to search for documents) to find covered documents matching the query text according to a particular query language. While a particular embodiment of creating vectors from query search results is shown below, other methods of creating vectors from query search results may be used. In one embodiment query results embedding may be created using contexts around query hits, e.g. text surrounding and/or including the hits within a document.

In operation 2.4, for each query, a query embedding vector associated with each query may be calculated or generated, typically based on the search results for the query. In one embodiment a query vector may be generated from the query results (e.g. the results of applying the query to documents to produce search results) rather than directly from the contents of the query text itself, and thus the vector for a specific query string may vary based on the documents searched over, and a query embedding vector may thus be based both on the query and the documents the query is applied to.

A query vector may be based on a word embedding model (e.g. Word2Vec) and may measure the linguistic context of the search results for the query, possibly inherited from the vectors for phrases in the search result for the query. In one embodiment, the linguistic context of the search results is determined based on vectors for phrases in the search results.

A vector may be for example an ordered list of numbers. One example word embedding vector using dimension 5 (other dimensions may be used), for a document with 3 words: "automatic", "speech" "recognition" could include three vectors, one for each word, and an additional vector for the document. Each of the words may have or be associated with a 5 dimensional vector with norm 1, for example "automatic" may have an embedding of [0.25, 0.5, 0.25, 0.75, 0.25], "speech" may have an embedding of [0.5, 0.25, 0.25, 0.25, 0.75], and "recognition" may have an embedding of [0.25, 0.5, 0.25, 0.25, 0.75]. The document may have as an embedding the normalized sum of the three component words, the sum of [1.0, 1.25, 0.75, 1.25, 1.75] which is normalized to [0.36, 0.45, 0.27, 0.45, 0.63].

The vector or embedding may be an ordered list of values having the same dimensionality (e.g. 200 values or dimensions) as the topic vector and phrase vectors. Using such a method of indirect vector creation may implicitly weight important phrases, those that are found using the query more often, as more important. A query can be any method or process that produces results, and that query process can have a vector created from the results.

A query vector may be based a set of search results by for example aggregating or averaging vectors for search results (e.g. documents, interactions) found by or covered by the query, and/or directly from phrase vectors which are found in the search results. In some embodiments, the vectors created for the different categories of data items have the same dimensionality or number of members. Typically, the vectors created for the various entities having vectors are created using the same basic method or algorithm.

In one embodiment, to create query vectors (operation 2.4) phrases (or key phrases) that occur in a certain local sample of returned or found documents (e.g. "query hits") may be analyzed to find phrases in those local samples, and the embedding vectors associated with those phrases (e.g. calculated in operation 2.2) may be averaged across all query hits, or across all vectors associated with phrase found, to produce a vector for the query. Thus as shown in FIG. 3, an input to operation 2.4 is the document or interaction itself. A phrase "occurring in" text may mean that the words in the phrase appear in the text in (if there is more than one word in the phrase) the order they appear in the phrase, possibly accounting for stemming, and possibly with other words in-between the words in the phrase. This may save computation, as the actual vectors from text are calculated once, for phrases, and not again for documents or text in query results, and not again for the queries themselves. This may mean that the choice of key phrases used or the calculation of key phrases affects the query vectors.

In operation 2.5, a report or visualization may be created. The queries and topics may be analyzed; for example their vectors may be compared to determine which query matches or covers which topic or cluster, which may indicate topics for which no query provides coverage. Queries may be assigned to topics. A visualization, graph or display may be created showing topics (or representations of topics), and queries (or representations of queries) connected by links or edges (e.g. by visual lines connecting the relevant entities) where the weight of the edges is for example equal to the cosine similarity between the topic embedding vectors. The visualization may be a force directed graph, where link length between objects is affected by parameters causing attractive and repulsive properties, e.g. the weight of the link. One measure of the strength of the attractive property in some embodiments of a visualization is the semantic similarity; thus objects semantically similar are closer and have shorter links between them.

A topic may be represented or named by a certain subset of or summary of phrases in the topic; for example the top X phrases in the topic, for example measured by cosine distance to the topic centroid. For example, the three phrases closest to the centroid by some determination of distance may be used to name the topic. The graph may be for example a force-directed graph, for example displayed in a browser using the known D3 (Data-Driven Documents) library. The D3 library is a JavaScript library for producing data visualizations in web browsers. Other formats of graphs or displays may be used, and other reports may be used: for example, an ordered list of topics and member phrases may be produced. The graph may include representations of queries, with each vertex or edge connecting objects in the graph having an embedding vector associated with it. A topic may be connected to one or more queries, and queries may be connected to one or more topics, but for some topics and queries, there may be no connections. Such a graph may show relationships between topics and edges between queries and topics. In one embodiment phrases are not included in the graph unless a topic is expanded, e.g. by a user clicking on or indicating the topic. Producing a graph or other result may indicate or determine if a query covers a topic or cluster by for example showing a topic not linked to a query; such a result may indicate or determine a query covers a topic by for example showing a topic linked to a query.

The operations of FIG. 3 are examples only, and different operations may occur in different embodiments.

FIG. 4 is a flowchart of an example method for creating query embeddings or query vectors according to embodiments of the present invention. FIG. 4 provides more detail for some operations shown in FIG. 3. While in one embodiment the operations of FIG. 4 are carried out using systems as shown in FIGS. 1 and 2, in other embodiments other systems and equipment can be used. In operation 3.1, query results may be used or referenced to find local text or transcripts in the regions within documents the relevant query matches. For example, a time window around the query result or hit within the document, e.g. of 5 seconds of speech (converted to text) on either side of the query hit, may be used to identify relevant text, where document or transcript words that occur within the time window are included in the local transcript. This may result in a single local transcript for each query result. Other time windows may be used.

In operation 3.2, using local text or transcripts, key phrases may be extracted or found in the documents in query results, or in the local text or transcripts. Typically, this is performed using the phrases generated in operation 2.1 (FIG. 3), as shown by the input "Key Phrases" to operation 3.2, so that the embeddings created in operation 2.2 can be used.

In operation 3.3, embeddings or vectors for the found key phrases may be referenced or looked up to find the embedding created in operation 2.2 associated with each key phrase found in or occurring in local transcripts. In operation 3.4, the vectors for key phrases corresponding to search results for each query may be used (e.g. averaged) to calculate a final embedding vector for each query.

The operations of FIG. 4 are examples only, and different operations may occur in different embodiments.

FIG. 5 depicts a schematic data-flow example of a generation of a query embedding or vector according to one embodiment. A query "Billing=FIRST_120(AND_30(OR ("question","calling")), "bill")))" (using one example query format), may be executed over a set of document. Query results including four example matches 510 may include for example document or file (e.g. an identification or number for the document), start time in seconds within the document, and end time in seconds. In a typical embodiment, more than four results are found. Other formats for results, and other query formats, may be used. Four local transcripts 520 each corresponding to a result 510, may be created. Phrases such as key phrases may be found in local transcripts (e.g. text excerpts within a certain text or time distance from the query hit within the document), and the vectors associated with each key phrase may be looked up or referenced. In FIG. 5, in local transcripts 520, specific query matches have been highlighted with bold, and the key-phrase matches 530 (e.g. matches to pre-defined key phrases found for example in operation 2.1) have been highlighted in local transcripts 520 with italics. Typically, the same set of key phrases is used to create query embeddings and topic embeddings, and the specific key phrases found in a search result for a document collection are the key phrases used in calculating query vectors for the search. Phrase matches 530 from the local transcripts may be matched or paired with their respective phrase embedding vectors 540 (e.g. created in operation 2.2, FIG. 3). Phrase embedding vectors 540 (depicted vertically) may in one embodiment be averaged to calculate the final query embedding vector 550. A phrase found in more than one returned or found document from the query may have its vector used a number of times equal to the number of documents in which it is found in the calculation of (e.g. the averaging) the query vector, weighting that query. For example, phrase A being found 10,000 times in a search result and phrase B being found 5,000 times causes phrase A to be weighted twice as much as phrase B in the query vector. Other calculations may be performed to convert phrase embedding vectors to query vectors.

In some embodiments, query embeddings or vectors may be used as input to the topic clustering or grouping (e.g. operation 2.3 of FIG. 3) algorithm. One clustering method for creating topics uses the k-means++ initialization algorithm for initializing a k-means operation. The k-means algorithm may be pre-configured to divide entities (e.g. topics) into K clusters or groups. K may be an arbitrary number, e.g. 100, or may be chosen for example as a proportion of the number of queries to be analyzed, or by a user. It is possible to have a query that is very different from any the phrases in the analysis and thus will be an orphan, not connected to any topics. In one embodiment, the first N topic centroids (e.g. 50 in one embodiment, but other numbers may be used) of the k-means algorithm may be initialized using the query embedding vectors such as those calculated in operation 2.4 of FIG. 3. The next (K-N) centroids (of the K centroids) using k-means are then initialized using the same logic as k-means++. This may alter the topic clustering to be more consistent with the semantic partitioning chosen by the queries. The K++ algorithm, or another algorithm, may be used to build up clusters following this initial seeding.

Embodiments of the invention may find topics, clusters or groups with no query coverage (e.g. no query is semantically related to the topic by some measure). In order to do that, some embodiments determine for each topic and for each query which topics, clusters or groups are covered by the queries and which topics are not covered by the queries; or which topics or groups are connected to queries and which are not; or for each topic if the topic is covered by a query or is not covered by any query. In a graph visualization links or edges between topics and queries or other entities may be created; topics with no links or no visualized links may be deemed to be not covered. Links or edges may also be created between topics and other topics. A link may be created between entities such as topics and other topics or queries based on for example the strength or another measure of the linguistic similarity, e.g. the cosine similarity, between the entities, for example using the embedding or vector for the similarity. Such measures may also be used to position entities nearer to each other if for example they are linguistically similar or are similar based on cosine similarity. In one embodiment to determine the position of entities, the known D3-force library may be used to simulate a force-directed graph, using certain pre-set parameters such as charges (e.g. −1,500), gravity (e.g. 0.05), and friction (e.g. 0.9) may be constant across the nodes. The link distance may be given by for example (1.8—Similarity) and the link weight may be set equal to the Similarity (where Similarity may equal cosine similarity between the vectors for the entities being compared and mapped). This may make the target distance shorter or smaller for more similar topics and queries. Additionally, the weight of the edges may have a thickness proportional to the Similarity. Line thickness may be visualized. The D3-force library based simulation may be allowed to run iteratively, e.g. for 8,000 iterations before display. Different parameters and constants may be used.

In one embodiment, a query node or representation in a graph may be linked, e.g. by a visual edge or link, to a topic node or representation if the cosine measure is greater than a threshold. A threshold may be chosen, possibly based on the specific values of each graph, so that each query has a maximum and minimum possible number of links to topics, for clarity; e.g. at most three links to topics and at least one link to a topic. In other examples, a fixed cosine similarity threshold (e.g. 0.6) may be used without consideration of the number of links or edges to an entity (e.g. a topic, a query, or other visualized entity). The more links to a topic, the more covered the topic is. Thus in some embodiments whether or not a topic is covered depends on the threshold chosen, and/or the method of calculating the strength of links or edges and/or other factors such as those discussed herein.

To determine if entities are linked, embodiments may use a comparison of query embeddings and topic embeddings. For example, one embodiment may use the cosine similarity measure, which may measure similarity between two non-zero vectors using the cosine of the angle between them. Other measures of similarity may be used.

A similarity vector $s^q$ may be created for each query q to be visualized, where element t of the vector is the cosine similarity (or another measure in other embodiments) between the vector for query q and the vector for topic t. An adaptive or configurable threshold may be used for determining if a query and a topic should be linked (or a topic and another topic). A link or edge between a query and topic may indicate the query "covers" the topic. Thus whether or not a query is considered to cover a topic may be based on decisions as to parameters used in the measures such as similarity vector $s^q$ used herein.

Order statistics (e.g. finding the kth-smallest value in the similarity vector) may be used to set the threshold so that each query matches a certain number or range of numbers of topics; for example in one implementation between 1 and 3 topics. In one embodiment a query is considered to be linked to or "covering" a topic if the strength of the link between the query and the topic is greater than a threshold. The threshold may be adaptive in the sense that the threshold may be tuned, for each topic or for each query, so that a certain range of numbers of topics and/or queries are connected to each. For example, the threshold may be tuned for each topic so that each topic is connected to no less than one and no more than three other topics. Other ranges, or tuning or adaptiveness measures, may be used. The strength of the link between a topic and a query may be used to determine if the query is considered to be linked to or "covering" the topic, typically if the strength of the link is greater than the threshold. In one embodiment, a default threshold of 0.6 is used, and it is adjusted to achieve the desired range of link numbers.

In one embodiment, the query-topic link threshold, such that if the cosine similarity in similarity vector $s^q$ for query q and topic t (where element t of the vector is the cosine similarity between topic vector q and query vector t) is above this threshold there is a link, is given by $R_q$, defined in one embodiment by:

$$R_q = \min(s_{(K)}^q, \max(0.6, s_{(K-2)}^q))$$

where $s_{(K-2)}^q$ is the third highest scoring topic similarity (e.g. cosine similarity) to query q, and $s_{(t)}^q$ is the similarity of query q to topic t. K–2 may be changed to produce the n'th highest scoring topic similarity, so that using K–n, n+1 is the maximum number of links created between the query and topics. R may change or be different for each query.

The set of edges E in the graph may then be produced using for example:

$$E = \{(q,t) \in Q \times T | s_t^q \geq R_q\}$$

Where q represents a specific query, t represents a specific topic, Q is set of queries, T is the set of topics, Q×T is the set of all possible query-topic links, the single vertical line in set-builder notation, means "such that", and the above descriptions for other terms apply.

Other suitable measures of link strength, determinations of whether there are links between entities, the similarity between entities, etc., and other specific formulas, may be used.

In some embodiments, a similar set of operations may be used to find and visualize relationships among topics. A layout may be created where related topics are located near each other. A cosine similarity measure may be used to create a vector $s^t$ for each topic t, where each within the vector element tX is the cosine similarity between topic vector t and another topic vector tX. An adaptive threshold may be used for determining topic-topic similarity. Order statistics may be used to set the threshold so that each topic matches for example a range of topics, e.g. between 1 and 3 topics, for example:

$$R_t = \min(s_{(K)}^t, \max(0.6, s_{(K-2)}^t))$$

where $s_{(K-2)}^t$ is the third highest scoring topic similarity to topic t.

The set ETopic of topic-topic edges in the graph may then be given by, for example:

$$ETopic = \{(t,tX) \in T \times T | s_{tX}^t \geq R_t\}$$

Where t and tX are two specific topics, T is the set of topics, and T×T is the set of all possible topic-topic links, and other definitions are similar to those described above.

Other formulas, threshold and parameters may be used.

Query coverage for every topic may in some visualizations or reports be considered to be binary—covered or not covered—but this coverage may be defined by the parameters and formulas discussed herein, or other suitable measures. Query coverage for a topic may also be considered to be, if the topic is covered, a measure of how covered or how strongly covered the topic is. Query coverage for every topic may be defined for example by the degree of the topic vertex (the number of links between queries to the topic), or by other measures such as the sum or max similarities to other topics. For example, query coverage may be defined by one of the three example measures below, or by another suitable definition:

Coverage(t)=deg(t) defining the number of links from queries to topic t.

$$\text{Coverage}(t) = \max_{\{q \in Q: (q,t) \in E\}} s_t^q$$

which is a measure of the strongest (e.g. "maximum") links from queries to topic t, using the definitions the terms discussed elsewhere herein.

Coverage (t)=$\Sigma_{\{q \in Q:(q,t) \in E\}} s_t^q$ which is a measure of the strength of all links to topic t.

Such measures of coverage may be visualized, e.g. as a feature of a graph, or used to define or order a list of least covered topics.

Figure 6:
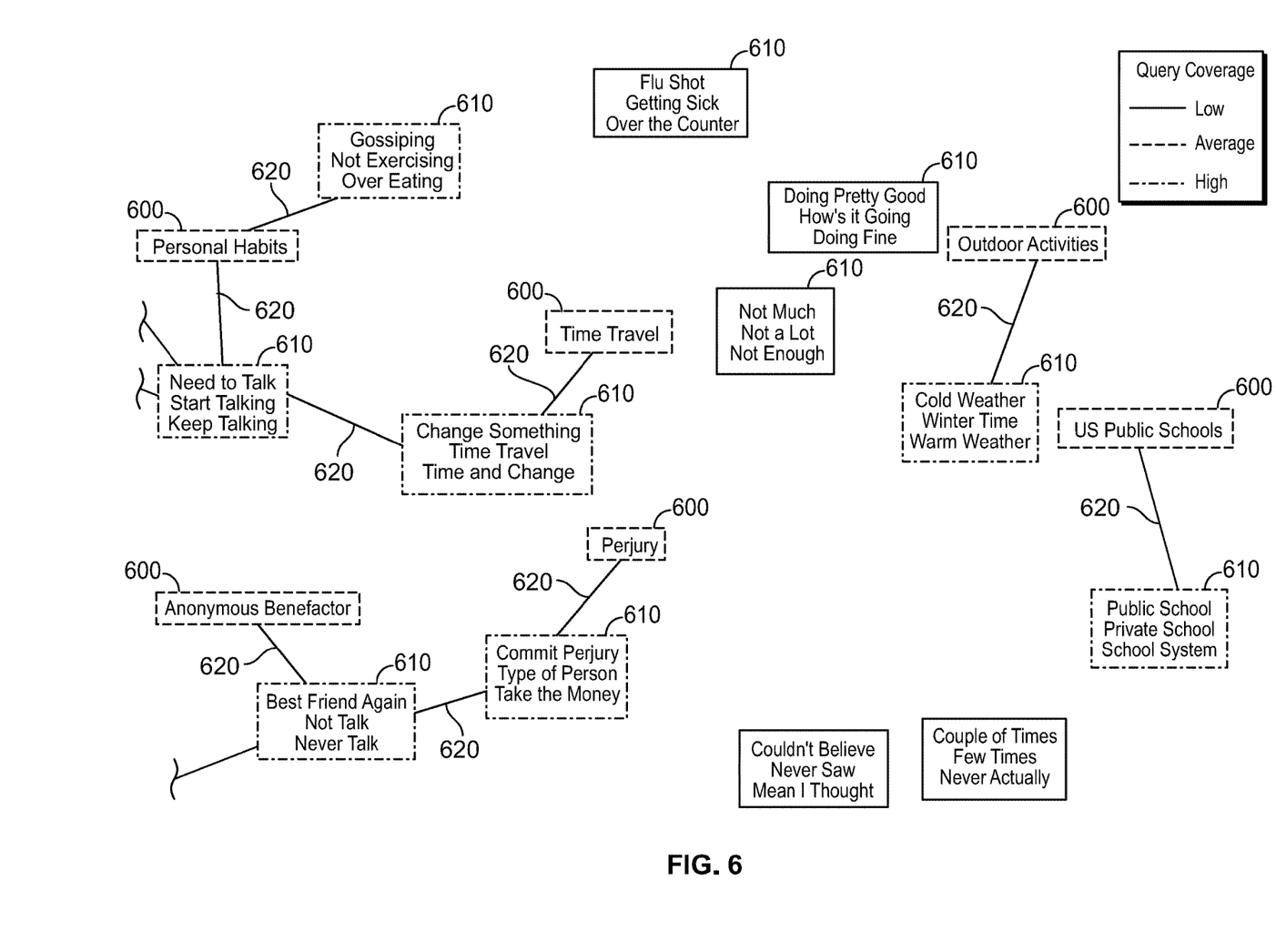
FIG. 6 is a portion of a visualization according to embodiments of the present invention.

FIG. 6 is a portion of a visualization in the form of a graph according to embodiments of the present invention. Other visualizations, such as lists, may be created. The portion of the example graph of FIG. 6 shows a combined topic-query graph using a force directed visualization. Other types of graphs may be used. The query nodes 600 may be displayed being labelled by name (e.g. a name assigned by a user, separate from the actual query, such as a query using operators as shown in Table 1) and for example a certain color or highlighting. Color or highlighting may indicate for topics for example low, average and high coverage: for example the "flu shot/getting sick/over the counter" topic may be shown in red to indicate low coverage, the "change something/time travel/time and change" topic may be shown in pale blue to indicate average coverage, and the "need to talk/start talking/keep talking" topic may be shown in green to indicate high coverage. Query nodes 600 may be for example a box with text identifying the query, an icon or symbol including a query identifier, etc. Embodiments may highlight in visualizations topics with little semantic similarity to queries, e.g. in red. Topics 610 may be displayed using for example their top three phrases as a label (or another number). Other types of textual names or labels may be used, and other visualizations for topics may be used such as icons or symbols. The "top" or most relevant phrases to the topic may be based on for example counts or number of phrase matches and/or similarity of phrases to the topic embedding vector, or closeness of phrases in cosine distance to the centroid of topics (e.g., the closer to the phrase to the centroid the more relevant the phrase).

Topic nodes 610 may be displayed as for example a box with text identifying the topic, an icon including a topic identifier, etc. Links, lines or edges 620 may connect topics to queries which cover the topics by the measures discussed herein, and may provide other connections such as between topics deemed related or semantically close. In one embodiment a link occurs where the query search results include documents within the topic; other measures may be used. In some embodiments there may be no link between a topic and query when it is determined or deemed that the query does not cover the topic; when the link strength between the two is lower than a threshold, or by other measures. Other methods of labelling or describing queries and topics may be used, and color code and size may be configurable.

In one embodiment topic color is based on the query coverage of the topic: e.g. red means the topic is not well covered or not at all covered by queries; pink means the topic is adequately covered; and green means the topic is well covered. Such a visualization may highlight topics with low semantic coverage by existing queries. The color of the topics may be highlighted for example when there are no queries linked to the topic, or when there are no queries semantically related to the topic, when no queries cover the topic, etc. Using such visualizations, a business analyst may quickly explore the semantic space to find topics that are not covered by queries, then explore these topics to find language that is useful for building a new query. In one embodiment, a viewer may expand a topic to display constituent phrases by clicking on the topic.

In other embodiments, other reports or visualizations may be used. For example, a graph may mark (e.g. by graying out) topics not covered by queries (e.g. with no links or by other measures discussed herein). Instead of a graph, a list may be presented. A report may be returned identifying topics which are covered, and topics which are not covered, without using a graph. A list visualization may be for example as in Table 2 below with Topics (represented by the top three phrases in the topic) listed on the left and queries (which may be named e.g. by a user) deemed corresponding to or covering the topics on the right, with the topics having the fewest matches listed first at the top:

TABLE 2

| Topic | Query |
|---|---|
| FLU SHOT, GETTING SICK, OVER THE COUNTER | — |
| NOT MUCH, NOT A LOT, NOT ENOUGH | — |
| DOING PRETTY GOOD, HOW'S IT GOING, DOING FINE | — |
| COULDN'T BELIEVE, NEVER SAW, MEAN I THOUGHT | — |
| COUPLE OF TIMES, FEW TIMES, NEVER ACTUALLY | — |
| COLD WEATHER, WINTER TIME, WARM WEATHER | Outdoor Activities |
| PUBLIC SCHOOL, PRIVATE SCHOOL, SCHOOL SYSTEM | US Public Schools |
| COMMIT PERJURY, TYPE OF PERSON, TAKE THE MONEY | Perjury |
| CHANGE SOMETHING, TIME TRAVEL, TIME AND CHANGE | Time Travel |
| . . . | . . . |

Certain processes used with embodiments of the present invention, such as a version of the Word2Vec algorithm used with some embodiments, may be implemented by machine learning, which may be implemented using a neural network. E.g. calculating or creating vectors such as phrase vectors may be performed, e.g. using the Word2Vec process, using embedding module 52 which may be, or may be implemented using, a neural network. A neural network may refer to an information processing paradigm that may include nodes, referred to as neurons, organized into layers, with links between the neurons. The links may transfer signals between neurons and may be associated with weights. Typically, the neurons and links within a NN are "virtual" and are represented by mathematical constructs, such as activation functions and matrices of data elements and weights. A processor, e.g. CPUs or graphics processing units (GPUs), or a dedicated hardware device may perform the relevant calculations. In some embodiments, vectors are calculated two ways: directly from text in a source (e.g. creating phrase vectors based on the text in the phrase) or from other vectors (e.g. creating query vectors based on phrase vectors), and the direct calculation may in some embodiments be via a neural network.

Embodiments of the invention may improve the technology of search generation and text document searching and management, and query or document analysis, by for example providing a unique method for semantically analyzing queries, without directly using the semantic aspects (e.g. text) of the queries themselves. Generating an embedding or vector based on search results may result in commonly returned phrases or text having more weighting in the production of the query vector than rarely returned phrases or text. For example, embodiments may be more robust than prior art technology. Using prior art technology, it may be the case that only interactions that have no matches to queries would be considered for further exploration. This could be a problem, since it is possible to have a query with characteristics or search terms that match all or most documents (e.g. "thank you for calling"). In this case, the set of all interactions without any query matches will be very small, making it difficult to discover new topics of conversation. However, embodiments of the invention may during semantic analysis of the results ignore a common phrase such as "thank you for calling" and determine semantic similarity using other phrases. Furthermore, embodiments may allow, during semantic analysis, that multiple phrases or documents are deemed to be in multiple topics. Embodiments may reduce the amount of time spent creating queries such as call-driver queries, and/or allow users to find new or emerging topics not semantically covered without manually listening to audio. Embodiments may create semantic vectors of queries based on query results in a novel manner, enabling the queries to be compared to documents such as transcripts. Embodiments may provide a novel and useful visualization of coverage based for example on semantic similarity of the query result vectors.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for assigning queries to topics, comprising, using a computer processor:
    searching, using a set of queries, over a set of text documents, to produce for each query a set of search results for the given query, each search result comprising a subset of text from a text document of the set of text documents;
    for each query, calculating a query vector based on the set of search results for the given query, wherein calculating the query vector is based on an average of vectors in the set of search results;
    for each of a set of topics describing the set of text documents, calculating a topic vector;
        wherein each topic vector is generated by clustering phrases extracted from the set of text documents into topics and, for each topic, calculating the topic vector as the centroid of the topic; and
        wherein a topic groups by proxy a group of documents among the set of text documents which are related by a common subject, the group of documents grouped based on component phrases appearing in each of the documents of the group of documents;
    generating a visualization of the set of queries and the set of topics using the topic vectors and the query vectors;
    determining a cosine similarity measure for the query vector and the topic vector in order to generate the visualization; and
    creating a link in the visualization if the cosine similarity measure is greater than a predetermined threshold;
    wherein the threshold is based on order statistics.

2. The method of claim 1, comprising calculating the query vector by:
    for each phrase in a set of phrases calculating a phrase vector for the phrase.

3. The method of claim 2, comprising calculating the phrase vectors using a neural network.

4. The method of claim 2, wherein each phrase vector is based on a word embedding model and measures the linguistic context of the associated phrase.

5. The method of claim 1, wherein the text documents comprise transcripts generated by ASR (automatic speech recognition).

6. The method of claim 1, comprising determining for each topic if the topic is covered by a query.

7. The method of claim 1, wherein the visualization of the set of queries and the set of topics using the topic vectors and the query vectors is a combined topic-query graph using a forced directed visualization.

8. A system for assigning queries to topics, comprising, using a computer processor:
    a memory and;
    a processor configured to:
        search, using a set of queries, over a set of text documents, to produce for each query a set of search results for the given query, each search result comprising a subset of text from a text document of the set of text documents;
        for each query, calculate a query vector based on the set of search results for the given query, wherein calculating the query vector is based on an average of vectors in the set of search results;
        for each of a set of topics describing the set of text documents, calculate a topic vector;

wherein each topic vector is generated by clustering phrases extracted from the set of text documents into topics and, for each topic, calculating the topic vector as the centroid of the topic; and wherein a topic groups by proxy a group of documents among the set of text documents which are related by a common subject, the group of documents grouped based on component phrases appearing in each of the documents of the group of documents;

generate a visualization of the set of queries and the set of topics using the topic vectors and the query vectors;

determine a cosine similarity measure for the query vector and the topic vector in order to generate the visualization; and create a link in the visualization if the cosine similarity measure is greater than a predetermined threshold;

wherein the threshold is based on order statistics.

9. The system of claim 8, wherein the processor is configured to calculate the query vector by:

for each phrase in a set of phrases calculating a phrase vector for the phrase.

10. The system of claim 9, wherein the processor is configured to calculate the phrase vectors using a neural network.

11. The system of claim 9, wherein each phrase vector is based on a word embedding model and measures the linguistic context of the associated phrase.

12. The system of claim 8, wherein the text documents comprise transcripts generated by ASR (automatic speech recognition).

13. The system of claim 8, wherein each query vector is based on a word embedding model and measures the linguistic context of the set of search results.

14. The system of claim 8, wherein the processor is configured to determine for each topic if the topic is covered by a query.

15. A method for analyzing queries, comprising, using a computer processor:

applying one or more queries to a set of documents, to produce query search results;

calculating a query embedding for each query, wherein calculating the query embedding is based on an average of vectors in the set of search results;

creating clusters based on the set of documents;

wherein the clusters are created by clustering phrases extracted from the set of documents into topics;

for each topic, calculating a topic vector as the centroid of the topic;

wherein a topic comprises a group of documents among the set of documents which are related by a common subject, the group of documents grouped based on component phrases appearing in each of the documents of the group of documents;

generating a visualization of the set of queries and the set of topics using the topic vectors and the query embeddings;

determining a cosine similarity measure for the query embedding and the topic vector in order to generate the visualization; and creating a link in the visualization if the cosine similarity measure is greater than a predetermined threshold;

wherein the threshold is based on order statistics; and determining for each cluster if the cluster is covered by a query using the topic vector and the query embeddings.

16. The method of claim 15, comprising calculating the query embedding by:

for each phrase in a set of phrases calculating a phrase embedding for the phrase.

17. The method of claim 16, comprising calculating the phrase embeddings using a neural network.

18. The method of claim 16, wherein each phrase embedding is based on a word embedding model and measures the linguistic context of the associated phrase.

19. The method of claim 15, wherein the documents comprise transcripts generated by ASR (automatic speech recognition).

20. The method of claim 15, wherein each query embedding is based on a word embedding model and measures the linguistic context of the query search results.

\* \* \* \* \*